United States Patent [19]
Couch, Jr.

[11] 3,787,247
[45] Jan. 22, 1974

[54] WATER-SCRUBBER CUTTING TABLE
[75] Inventor: Richard W. Couch, Jr., Hanover, N.H.
[73] Assignee: Hypertherm Incorporated, Hanover, N.H.
[22] Filed: Apr. 6, 1972
[21] Appl. No.: 241,783

[52] U.S. Cl. ............... 148/9 R, 266/23 R, 266/23 F
[51] Int. Cl. ............................................ B23k 7/10
[58] Field of Search ............. 148/9; 266/23 F, 23 R

[56] References Cited
UNITED STATES PATENTS

| | | | |
|---|---|---|---|
| 3,486,744 | 12/1969 | Beyers et al. | 266/23 R |
| 3,330,547 | 7/1967 | Powers | 148/9 R |
| 3,526,395 | 9/1970 | Brown | 266/23 R |
| 3,701,514 | 10/1972 | Walters et al. | 148/9 R |

Primary Examiner—W. W. Stallard
Attorney, Agent, or Firm—Melvin R. Jenney et al.

[57] ABSTRACT

The cutting table disclosed herein is particularly adapted for use in conjunction with a plasma arc cutting torch in a system in which the torch is traversed in a pattern over a metal plate workpiece to perform a desired cutting operation. The cutting table supports the workpiece at a multiplicity of points and includes means for containing a body of water with a surface in contact or at least close proximity with the bottom of the plate. Accordingly, as the high velocity gases performing the cutting impinge upon the body of water, they are forcefully intermixed therewith. Accordingly, the particulate pollutants entrained in the gas jet are effectively scrubbed out, rather than being carried into the atmosphere.

9 Claims, 4 Drawing Figures

WATER-SCRUBBER CUTTING TABLE

BACKGROUND OF THE INVENTION

This invention relates to a cutting table and more particularly to such a table which reduces the pollutants emitted from a cutting system in which metal plate is cut by means of hot high velocity gases, e.g., a plasma arc torch.

In plasma arc torch metal cutting systems, the high velocity cutting jet entrains a substantial quantity of minute particles comprising mainly oxides of the metal being cut. In prior art systems, these particles are permitted to remain entrained as the gases expand after departing the immediate cut area. Because of their small size, these particles constitute a major problem with regard to the release of contaminate material into the atmospheric environment. While many prior installations include duct and fan systems for removing of the exhaust gases from the immediate cutting area, this serves only to defer the ultimate problem, rather than to solve it. To actually remove these particulate pollutants from the exhaust gases has heretofore typically required an elaborate and expensive bag-house for filtering the exhaust gases before their release into the general atmosphere.

Amond the several objects of the present invention may be noted the provision of apparatus for substantially reducing the particulate emissions contained in cutting torch exhaust gases; the provision of such apparatus which substantially reduces the need for expensive and elaborate bag-house filtering systems; the provision of such apparatus which substantially reduces the noise generated by plasma arc torch cutting of metal plate; and the provision of such apparatus which is relatively simple and inexpensive, is uncomplicated in operation and is reliable. Other objects and features will be in part apparent and in part pointed out hereinafter.

SUMMARY OF THE INVENTION

Briefly, the present invention contemplates a workpiece supporting table which is adapted for use with a flame cutting torch such as a plasma arc torch. The table involves a plurality of workpiece supporting members providing workpiece supporting points lying in a common horizontal plane. The table also includes means for containing a body of water with a surface closely adjacent and substantially parallel to the workpiece support plane, the supporting members being at least partially submerged in the water. Accordingly, high velocity gases emerging from the torch, together with entrained oxide particles generated by the cutting operation, are forcefully impinged upon the surface of the water and are intermixed therewith thereby to substantially remove particulate pollutants from the gases prior to their release into the surrounding atmosphere.

The effectiveness of the scrubbing operation achieved by the high velocity gas impingement depends in substantial part upon the close proximity of the water surface to the bottom of the workpiece plate. In certain instances, actual contact of the water with the workpiece is possible in which case the noise generated by the cutting operation is substantially reduced by the damping effect of the water against the workpiece plate.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
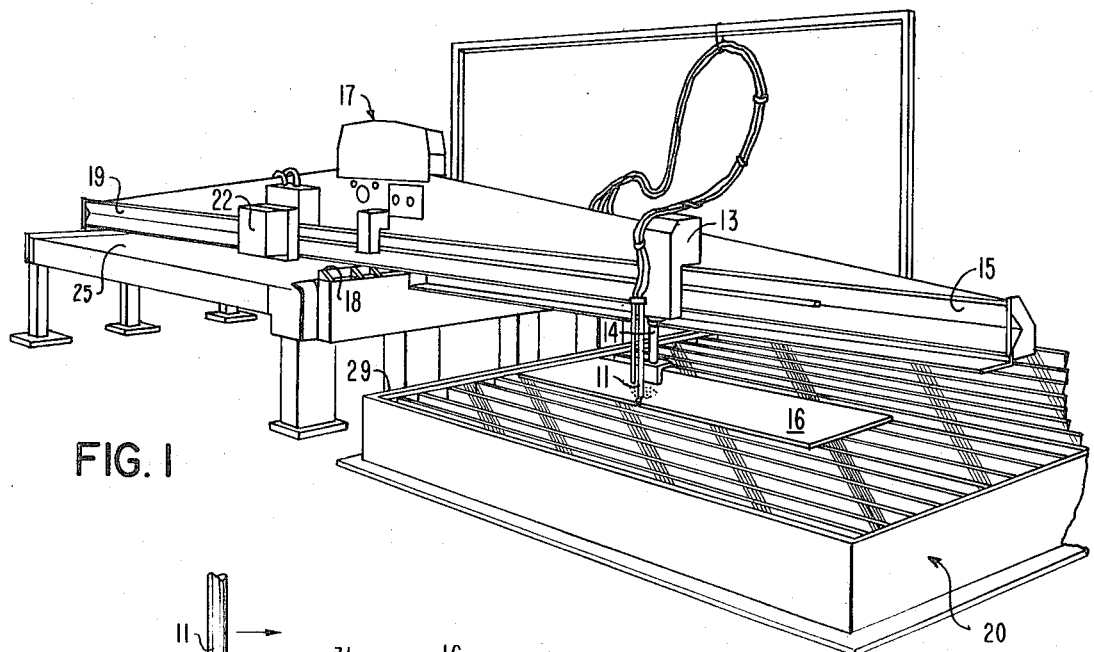
FIG. 1 is an overall perspective view of a metal plate cutting machine employing a water-scrubber cutting table in accordance with the present invention.

Referring now to FIG. 1, the cutting machine there illustrated employs a single plasma arc torch 11 mounted on a head 13. The head 13 includes a mechanical assembly 14 for raising and lowering the torch with respect to a workpiece, indicated at 16. The workpiece itself is supported on a cutting table constructed in accordance with the present invention and designated generally by reference character 20. A preferred form of torch is that disclosed in U.S. Pat. No. 3,641,308, issued to myself and Robert C. Dean, Jr. on Feb. 8, 1972. The head 13 is adapted to be traversed along a cantilevered beam arm 15 extending over the cutting table. The beam 15 itself is part of an assembly 17 which is adapted to be traversed along a rail 18 which extends transversely to the beam. Thus, the torch 11 is capable of being translated in two directions within a horizontal plane.

As is conventional with cutting machines of this general type, the beam assembly 17 includes a second arm 19, extending on the opposite side of the rail 18 from the torch supporting arm, over a pattern table 25. This arm carries a scanning head 22 which is adapted to trace either a pattern or a line drawing mounted on the pattern table. The scanning head is coupled to the torch head 13 through an appropriate servo mechanism so that the movement of the torch parallels that of the tracing head. Thus, a cut following a contour corresponding to the pattern can be generated. Tracing and traversing equipment of this general type is well known and is not described in detail herein.

Figure 3:
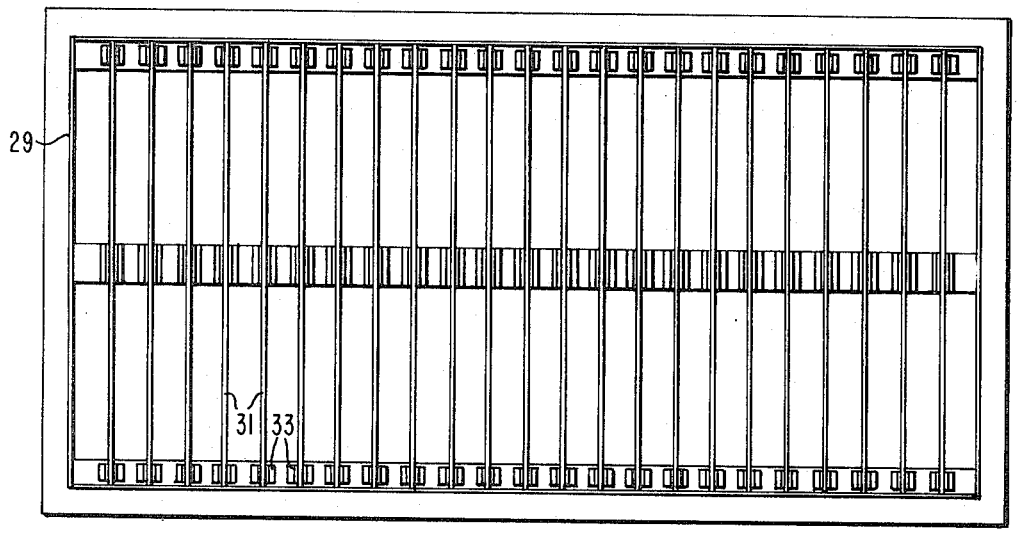
FIG. 3 is a plan view of the cutting table of FIG. 1.
Figure 4:
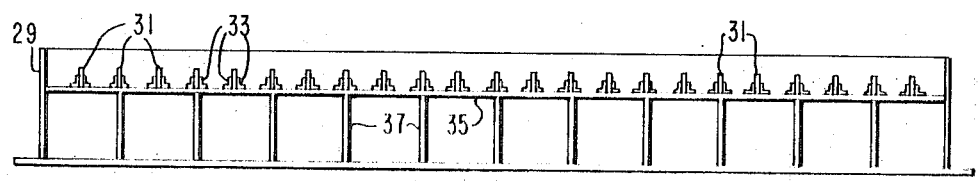
FIG. 4 is a sectional view substantially on the line 4—4 of FIG. 3.

As illustrated in FIGS. 3 and 4, the cutting table 20 comprises a shallow tank 29 within which are mounted a series of parallel metal slats 31. The slats 31 are held on edge, by clamp bolts 32, between brackets 33 which are mounted on a series of frames 35 and 37 within the tank. As cutting is accomplished by traversing the torch over the workpiece so that the supporting slats will periodically be crossed by the cut pattern, it is thus an advantage to have these slats readily removeable from within the brackets so as to be easily replaced when the cut damage done to each slat is extensive enough to warrant its replacement.

Figure 2:
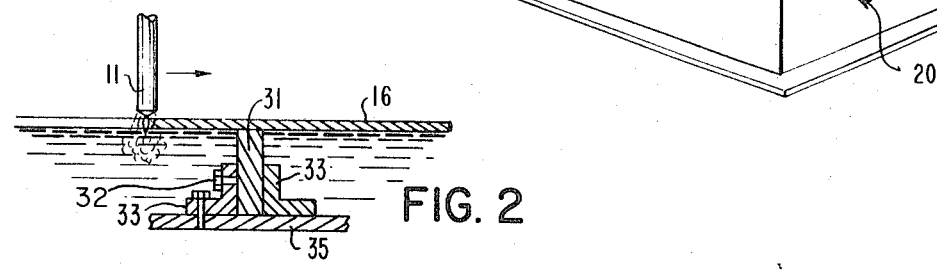
FIG. 2 is a sectional view illustrating the manner in which the high velocity cutting jet interacts with the water bath provided by the table of FIG. 1.

As illustrated in FIGS. 1 and 2, the tank is filled with water to a level which is up to, or nearly up to, the uppermost portions of the slats 31. When a workpiece 16 is then laid upon the slats, a horizontal water surface is provided in contact with or closely adjacent the bottom of the workpiece. A conventional automatic water level control (not shown) may be provided for maintaining the water at the desired level. Since the members supporting the workpiece, i.e., the slats 31 and their supporting frames and brackets, are at least partially immersed in the water bath which is provided for scrubbing out the particulate emissions, it can be seen that the supporting structures will be substantially less damaged by the operation of the cutting torches than would be the case if they were exposed. Likewise, since the workpiece supporting elements are protected by the water bath, it is feasible to provide a conveyor support system immersed in the water bath to bring material into and out of the cutting area. If desired, a mesh may be provided beneath the slats for catching smaller pieces of scrap as they fall.

In operation, as illustrated in FIG. 2, the jet of hot gases emerging from the torch 11 to cut the workpiece 16 forcefully impinge upon and therefore intimately intermix with the water in the tank 29. As is well understood, the cutting process generates a large quantity of fine particles, i.e., in the sub-micron range, which become entrained with the hot gases. In accordance with the present invention, the immediate impingement of these hot gases upon the surface of the water, before the gases have fully expanded, causes a high velocity or forceful intermixing of the gases with the water. This forceful intermixing provides a strong scrubbing action which tends to remove the particulate matter from the exhaust gases. As a result, the gases ultimately escaping from around the workpiece contain many fewer contaminates to pollute the atmosphere.

While the emission of particulate fumes depends upon many operating parameters, such as the type of torch used, the particular material being cut and the power level at which the cutting proceeds, a particular example serves to illustrate the manner in which the present invention can operate to reduce pollutant emissions. In cutting one-half inch thick stainless steel at a power level of 70 kilowatts, using the torch described in the previously identified patent, 10.0 grams of particulate fumes were generated per foot of cut without the water scrubbing. However, with the water-scrubber cutting table in use and filled with water to the bottom edge of the workpiece plate, all but 0.11 grams per foot of particulate fumes were eliminated.

The desirability of providing impingement and intermixing of the cutting jet with the water bath in very close proximity to the cut region, i.e., before the gases have fully expanded, may be illustrated by noting that the particulate emissions rose to 3.3 grams per foot when the cutting table was filled with water only to within 2½ inches of the bottom of the plate, the other test parameters remaining the same. Accordingly, for the purpose of defining the present invention, the phrase "closely adjacent" used with reference to the bottom of the workpiece may be understood to mean within 2 inches of the bottom of the workpiece and include levels up to and including contact with the workpiece. Since the normal cutting operation contemplates that the cutting torch will be traversed over the workpiece to provide a cut of the desired contour, the present invention contemplates that the water bath will be provided uniformly under all parts of the workpiece, i.e., the water bath will have a horizontal upper surface presumably essentially free except for contact with the workpiece.

The intermixing of the exiting gases with the water bath also provides a reduction in emissions of certain noxious gases. Principal among these gases are nitrogen dioxides ($NO_x$). With the water-scrubber cutting table filled to its optimum height, $NO_x$ emissions were reduced 80 percent, i.e. from 9 grams per minute to 1.8 grams per minute when cutting at a power level of 70 kilowatts.

A third advantage of the present invention is the reduction of the noise produced by plasma arc cutting, particularly when the water in the water-scrubber cutting table is actually in contact with the metal plate workpiece. In experiments under otherwise identical conditions, cutting one-inch stainless steel at a power level of 90 kilowatts, the noise level was reduced from 107 dB to 100 dB as measured by a microphone 6 feet from the torch and at a nominal ear level height. The significance of this reduction may be emphasized by noting that recently adopted safety and health standards limit exposure to 107 dB sound to 40 minutes while allowing exposure to 100 dB sound for two hours.

While the present invention has been described in relation to a plasma arc cutting torch, it will be understood from an appreciation of the nature of the water-scrubbing operation that the water-scrubber cutting table of the present invention is also useful with other cutting processes in which the cutting itself is performed by a high velocity jet of hot gases. Such cutting processes may be generically designated as flame cutting and include oxy-fuel and iron powder cutting.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a flame cutting system in which a torch is traversed over a metal plate workpiece in a desired cut pattern, a workpiece supporting table comprising:
   a plurality of workpiece supporting members providing a plurality of workpiece supporting points, which points lie in a common, horizontal plane;
   means for containing a body of water with a surface at least closely adjacent and substantially parallel to said plane, with said supporting members being at least partially immersed in said water, the high velocity gases emerging from said torch together with entrained particles generated by the cutting operation being forcefully impinged upon said water surface and being intermixed with the water thereby to substantially remove pollutants from said gases, prior to their release to the surrounding atmosphere.

2. A workpiece supporting table as in claim 1 wherein said workpiece supporting members are parallel slats.

3. A workpiece supporting table as in claim 2 wherein said slats are removably supported on edge.

4. In a plasma jet metal plate cutting system in which a plasma jet torch is traversed over a workpiece in a desired cut pattern, a workpiece supporting table comprising:

a plurality of workpiece supporting members providing a plurality of workpiece supporting points, which points lie in a common, horizontal plane;

means for containing a body of water with its upper surface substantially coincident with said plane, with said supporting members being substantially immersed in said water, the high velocity gases emerging from said torch together with entrained oxide particles generated by the cutting operation being forcefully impinged upon said water surface and being forcefully intermixed with the water thereby to substantially remove particulate pollutants from the gases prior to their release to the surrounding atmosphere.

5. A workpiece supporting table as in claim 4 wherein said workpiece supporting members are parallel slats clamped on edge in brackets located beneath the water surface.

6. A plasma jet metal plate cutting system comprising: a plasma jet torch;

a plurality of workpiece supporting members providing a plurality of workpiece supporting points, which points lie in a common, horizontal plane;

means for traversing said torch in a desired cut pattern over a workpiece supported on said members;

means for containing a body of water with a free surface closely adjacent and substantially parallel to said plane, with said supporting members being at least partially immersed in said water, the high velocity gases emerging from said torch together with entrained oxide particles generated by the cutting operation being forcefully impinged upon said free water surface and being forcefully intermixed with the water thereby to substantially remove particulate pollutants from the gases prior to their release to the surrounding atmosphere.

7. A cutting system as set forth in claim 6 wherein said traversing means includes a beam cantilevered over said cutting table, means for traversing said torch along the beam, and means for traversing said beam over said table in a direction transverse to the beam.

8. The method of cutting metal plate with a minimum generation of particulate atmospheric pollutants comprising:

providing a body of water with a horizontal upper surface;

supporting a metal plate workpiece horizontally and closely adjacent said water surface, the upper surface of the body of water being substantially coincident with the bottom surface of the workpiece;

traversing a flame cutting torch over said plate to generate a cut in a desired patern, the high velocity gases emerging from said torch being forcefully impinged upon said water surface and being forcefully intermixed with the water thereby to substantially remove particulate pollutants from said gases, prior to their release to the surrounding atmosphere.

9. The method of cutting metal plate as set forth in claim 8 wherein said torch is a plasma arc torch.

* * * * *